(12) United States Patent
Barnes et al.

(10) Patent No.: US 6,427,910 B1
(45) Date of Patent: *Aug. 6, 2002

(54) METHOD FOR MANAGING AND UPDATING OVERLOADED CARDS

(75) Inventors: Stacey Alan Barnes, Round Rock; Viktors Berstis, Austin, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/465,291

(22) Filed: Dec. 17, 1999

(51) Int. Cl.$^7$ ................................................. G06K 5/00
(52) U.S. Cl. ..................... 235/380; 235/379; 235/380; 235/376; 235/381; 235/382; 235/382.5
(58) Field of Search ................................. 235/376, 375, 235/382.5, 380, 379, 381; 705/7, 8, 9, 10, 11

(56) References Cited

U.S. PATENT DOCUMENTS

| | | | |
|---|---|---|---|
| 4,176,345 A | * 11/1979 | Micheron et al. ........... 340/373 |
| 4,288,788 A | * 9/1981 | Rogers et al. ............... 340/378 |
| 4,443,027 A | 4/1984 | McNeely et al. |
| 4,575,621 A | * 3/1986 | Dreifus ........................ 235/380 |
| 4,593,936 A | 6/1986 | Opel |
| 4,614,861 A | * 9/1986 | Pavlov et al. ................ 235/380 |
| 4,700,055 A | 10/1987 | Kashkashian, Jr. |
| 4,717,815 A | 1/1988 | Tomer |
| 4,766,293 A | * 8/1988 | Boston ........................ 235/379 |
| 4,766,294 A | 8/1988 | Nara et al. |
| 4,771,460 A | * 9/1988 | Tamada et al. .............. 235/380 |
| 4,797,542 A | * 1/1989 | Hara ........................... 235/380 |
| 4,800,255 A | 1/1989 | Imran |
| 4,806,745 A | 2/1989 | Oogita |
| 4,812,634 A | 3/1989 | Ohta et al. |
| 4,851,654 A | 7/1989 | Nitta |
| 4,868,376 A | * 9/1989 | Lessin et al. ............... 235/380 |
| 4,874,934 A | 10/1989 | Nakahara et al. |
| 4,876,441 A | 10/1989 | Hara et al. |

(List continued on next page.)

FOREIGN PATENT DOCUMENTS

| | | | |
|---|---|---|---|
| DE | 2838277 | * | 3/1979 |
| DE | 004138131 A1 | | 4/1993 |
| JP | 01214820 | * | 8/1989 |
| JP | 404367090 A | | 12/1992 |
| JP | 405210771 A | | 8/1993 |

OTHER PUBLICATIONS

U.S. patent application Ser. No. 09/465,292, Barnes et al., filed Dec. 17, 1999, pending.
U.S. patent application Ser. No. 09/465,289, Barnes et al., filed Dec. 17, 1999, pending.
U.S. patent application Ser. No. 09/465290, Barnes et al. filed Dec. 17, 1999, pending.
U.S. patent application Ser. No. 09/465,293, Barnes et al., filed Dec. 17, 1999, pending.

*Primary Examiner*—Karl D. Frech
*Assistant Examiner*—Uyen-Chau Le
(74) *Attorney, Agent, or Firm*—Marilyn Smith Dewkins; Bracewell & Patterson, L.L.P.

(57) ABSTRACT

A system for managing services of a host card having multiple card services associated therewith. The host card is set up as an overloaded card by associating at least one other service of the at least one other card to the host card. The overloaded card with the overloaded services are managed. Overloaded card management data relating to the overloaded card and the overloaded card services are maintained, stored, and/or updated to reflect a change, if any, made to the overloaded card and with respect to the overloaded card services. Appropriate actions are performed in response to the change.

27 Claims, 8 Drawing Sheets

U.S. PATENT DOCUMENTS

| | | | |
|---|---|---|---|
| 4,973,828 A | * 11/1990 | Nasure et al. | 235/380 |
| 5,055,662 A | 10/1991 | Hasegawa | |
| 5,072,103 A | 12/1991 | Nara | |
| 5,223,699 A | 6/1993 | Flynn et al. | |
| 5,239,583 A | 8/1993 | Parillo | |
| 5,276,311 A | 1/1994 | Hennige | |
| 5,319,491 A | * 6/1994 | Selbrede | 359/291 |
| 5,324,922 A | 6/1994 | Roberts | |
| 5,388,148 A | 2/1995 | Seiderman | |
| 5,477,040 A | 12/1995 | Lalonde | |
| 5,478,994 A | 12/1995 | Rahman et al. | |
| 5,521,363 A | 5/1996 | Tannenbaum | |
| 5,530,232 A | 6/1996 | Taylor | |
| 5,546,523 A | 8/1996 | Gatto | |
| 5,550,897 A | 8/1996 | Seiderman | |
| 5,559,313 A | 9/1996 | Claus et al. | |
| 5,578,808 A | 11/1996 | Taylor | |
| 5,590,038 A | * 12/1996 | Pitroda | 235/380 |
| 5,627,355 A | 5/1997 | Rahman et al. | |
| 5,665,448 A | * 9/1997 | Graham et al. | 428/79 |
| 5,682,027 A | 10/1997 | Bertina, et al. | |
| 5,714,744 A | 2/1998 | Brice | |
| 5,731,575 A | 3/1998 | Zingher et al. | |
| 5,747,928 A | * 5/1998 | Shanks et al. | 313/498 |
| 5,771,321 A | * 6/1998 | Stern | 385/31 |
| 5,801,367 A | 9/1998 | Asplund et al. | |
| 5,850,599 A | 12/1998 | Seiderman | |
| 5,859,419 A | 1/1999 | Wynn | |
| 5,875,437 A | 2/1999 | Atkins | |
| 5,884,271 A | 3/1999 | Pitroda | |
| 5,936,221 A | 8/1999 | Corder et al. | |
| 5,940,511 A | 8/1999 | Wilfong | |
| 5,955,961 A | 9/1999 | Wallerstein | |
| 6,038,551 A | 3/2000 | Barlow et al. | |
| 6,068,183 A | 5/2000 | Freeman et al. | |
| 6,145,739 A | * 11/2000 | Bertina et al. | 235/380 |
| 6,216,955 B1 | 4/2001 | Le Roux et al. | |

\* cited by examiner

METHOD FOR MANAGING AND UPDATING OVERLOADED CARDS

RELATED APPLICATION

The present invention is related to the subject matter of commonly assigned, copending U.S. patent applications: Ser. Nos. 09/465,292; 09/465,289; 09/465,290; and 09/465,293. The content of the above-identified applications is incorporated herein by reference.

BACKGROUND OF THE INVENTION

1. Technical Field

The present invention relates in general to an overloaded card manager, and, in particular, to a system and method for managing an overloaded card which is an existing card that has its own card service(s) that is overloaded with services for other cards wherein the existing card is the only card that has to be used. Still particularly, the present invention relates to an overloaded card manager that allows efficient management of the overloaded card and the overloaded card services, that allows easy or automatic updating or changing of information relating to the overloaded card and overloaded card services, and that allows easy switching of the overloaded card in being designated as one existing card to another existing card.

2. Description of the Related Art

A person may typically carry a various number of cards, such as credit cards, driver's license card, membership cards, etc., with him or her. However, the carrying of so many cards may be quite cumbersome and bulky for a person. For example, the large number of cards may cause a person's wallet to bulge. Also, the tasks of managing and tracking so many cards may become quite a hassle or burden.

Various types of universal cards or smart cards have been developed to integrate convenience and usability of multiple cards of a user into a single card. For these types of universal cards or smart cards, a generic universal card or generic smart card is provided, and the card services from all the different cards that a person owns is associated and programmed to the single universal card or smart card. The single generic card is generally used to integrate card services from various cards, and the card itself has no other functions or inherent operations. Some of these universal cards or smart cards require changing, updating, and/or maintaining of stored data on the cards themselves or may require the informing of the card service providers of the various cards regarding the integration of the cards to the universal card or smart card. Furthermore, some of these universal cards or smart cards require a power source to maintain, store, and/or display the data on the card. U.S. Pat. No. 5,530,232 to Taylor; U.S. Pat. No. 4,700,055 to Kashkashian Jr.; U.S. Pat. No. 4,443,027 to McNeely et al.; U.S. Pat. No. 5,546,523 to Gatto; U.S. Pat. No. 4,593,936 to Opel; U.S. Pat. No. 5,276,311 to Hennige; U.S. Pat. No. 5,477,040 to Lalonde provide examples of such universal cards or smart cards.

However, the problem with universal cards or smart cards is that they require the providing of the additional generic cards that are not themselves inherently functional or operational cards. For authentication purposes, a vendor or business establishment may not simply accept the universal card or smart card on its face value and may still require seeing and verifying the existence of the actual, real card itself that has been integrated into the universal card or smart card. This requirement defeats one of the main purposes of having a universal card or smart card since the person would still have to carry the cards that were integrated into the single universal card or smart card in the event of an authentication or verification request.

Furthermore, the integration of several cards and their card services into one single card results in a management problem in that the services of all the cards associated to the single card have to be carefully tracked and maintained by the card user. However, such a management task may be extremely cumbersome and tedious. For example, if a card user wishes or needs to change his/her billing address, then the card user has to remember every card with a respective card service that has been associated to the universal single card. The card user then has to contact every respective card service provider for each of the cards associated to the universal single card. Furthermore, if the card user wishes to change using his/her present universal single card to using another universal single card, then the card user has to engage in the tedious tasks of tracking and remembering all of the card information associated with the first universal card, canceling the first universal card and its services, and setting up and programming the second universal card and its respective services with all of the information from the first universal card and any other new information.

It would therefore be advantageous and desirable to provide a card management system for managing services of a universal card. It would also be advantageous and desirable to provide a universal card manager that allows efficient management of the universal card and the universal card services. It would further be advantageous and desirable to provide a universal card manager that allows easy or automatic updating or changing of information relating to the universal card and universal card services. It would still further be advantageous and desirable to provide a universal card that allows easy switching of the universal card in being designated as one existing card to another existing card.

SUMMARY OF THE INVENTION

It is therefore one object of the present invention to provide an overloaded card management system for managing services of an overloaded card which is an existing card that has its own card service(s) that is overloaded with services for other cards wherein the existing card is the only card that has to be used.

It is another object of the present invention to provide an overloaded card manager that allows efficient management of the overloaded card and the overloaded card services.

It is a further object of the present invention to provide an overloaded card manager that allows easy or automatic updating or changing of information relating to the overloaded card and overloaded card services.

It would still further be advantageous and desirable to provide an overloaded card that allows easy switching of the overloaded card in being designated as one existing card to another existing card.

The foregoing objects are achieved as is now described. An overloaded card management system for managing services of an overloaded card which is an existing card that has its own card service(s) that is overloaded with services for other cards wherein the existing card is the only card that has to be used. The present system and method provide, use, and manage an overloaded card with overloaded card services. An existing card is associated with an associated card service that is used by a card user. The existing card is set up as the overloaded card with the overloaded card services by associating at least one other service of at least one other card to the existing card. The existing card is used as the overloaded card with the overloaded services which include the associated card service and at least one other service. The overloaded card with the overloaded services are managed. Overloaded card management data relating to the overloaded card and the overloaded card services are maintained and stored. A change, if any, made to the overloaded card and the overloaded card services is tracked. The overloaded card management data is updated to reflect the change. Appropriate actions are performed in response to the change.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides an overloaded card management system for managing services of an overloaded card which is an existing card having its own card service(s) that is overloaded with services for other cards wherein the existing card is the only card that has to be used. The present invention provides an overloaded card manager that allows efficient management of the overloaded card and the overloaded card services. The present invention provides an overloaded card manager that allows easy or automatic updating or changing of information relating to the overloaded card and overloaded card services. The present invention allows easy switching of the overloaded card in being designated as one existing card to another existing card. The present invention overloaded card manager is for managing an overloaded card, and the overloaded card has been disclosed in detail in the co-pending U.S. application Ser. No. 09/465,289 entitled "SYSTEM AND METHOD FOR OVERLOADING AN EXISTING CARD".

In the present invention disclosed in the figures, the users 15 may be one or more among a number of various card holders or users, such as User A 15A, User B 15B, User C 15C, . . . , User N 15N. The card 18 may be one of a number of various cards, such as card A 18A, card 18B, card 18C, . . . , card Z 18Z with respective card service CSA 20A, CSB 20B, CSC 20C, . . . , CSZ 20Z provided by the respective card service provider CSP A 17A, 17B, 17C, . . . , CSP 17Z. The overloaded card (OC) is designated and set up to be one of the cards 18 (i.e. may be card A 18A, card 18B, card 18C, . . . , or card Z 18Z). A number OCs 18 may be set up, and it may be one of a number of OCs, such as OCA, OCB, OCC, . . . , OCY.

Figure 1:
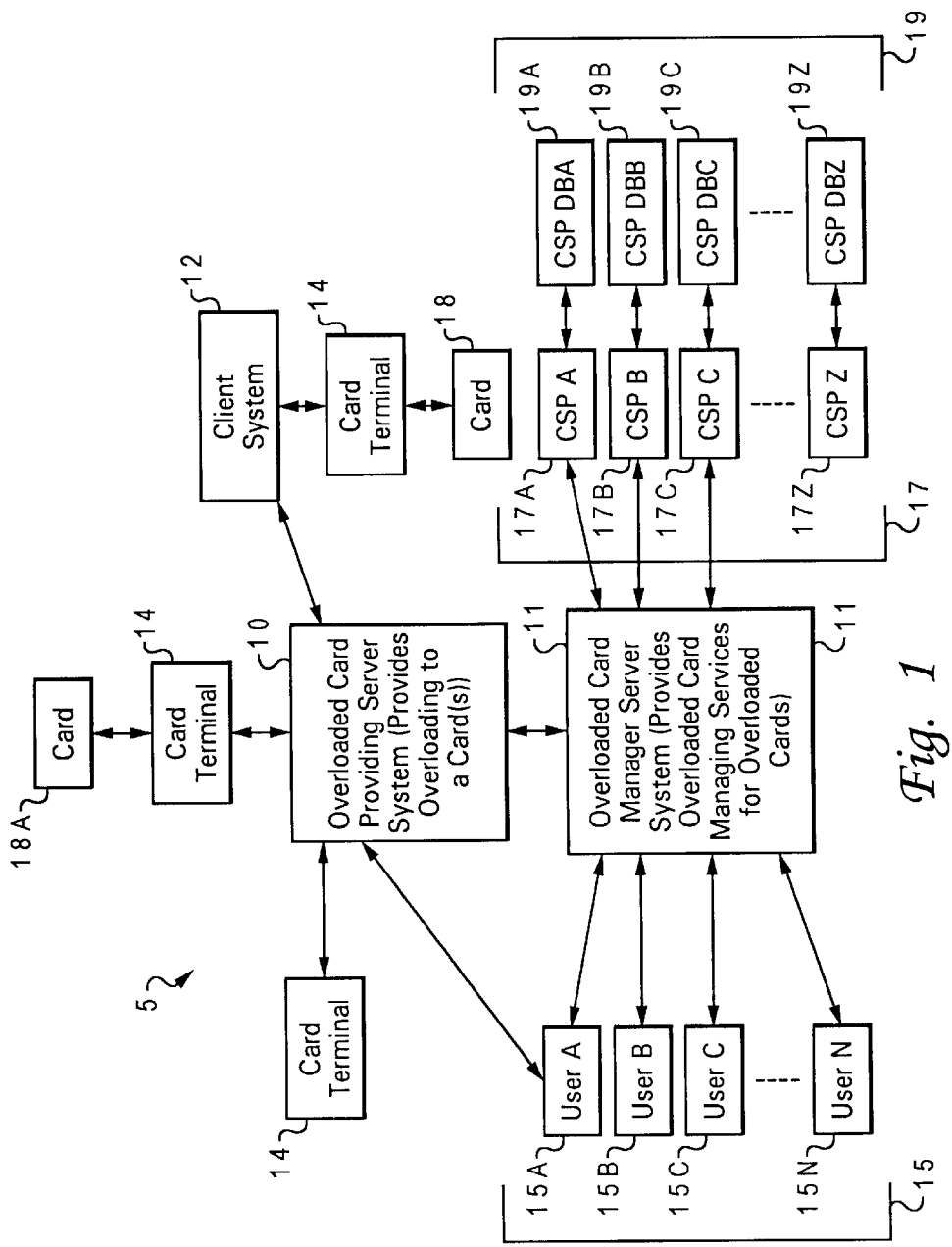
FIG. 1 is a block diagram illustrating a general topology of and relationship between card terminals, a client system, users, card service providers, an overloaded card providing server system that provides overloaded card services for overloaded cards, and the present invention overloaded card manager server system that manages each of the overloaded cards with their respective services.
Figure 3:
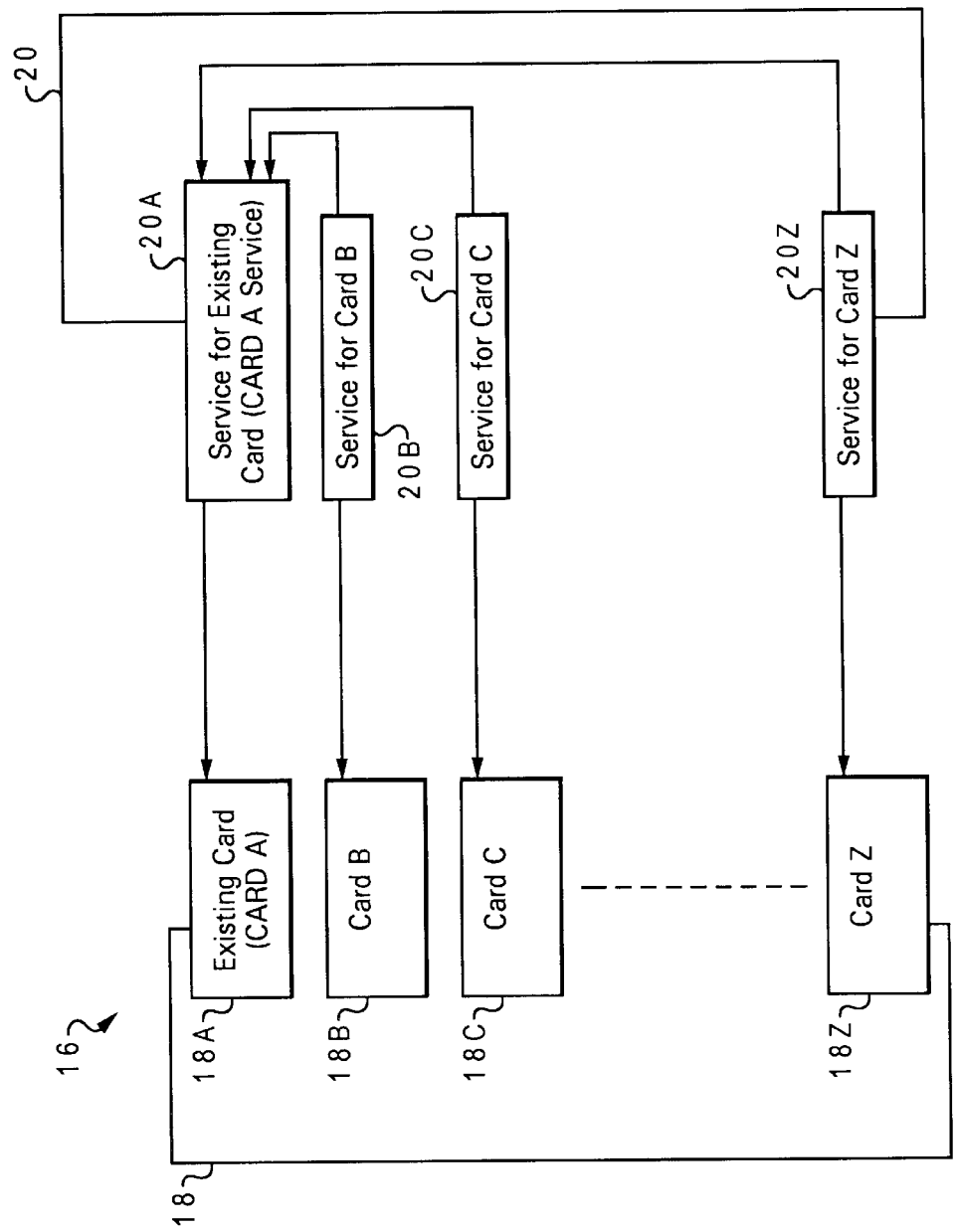
FIG. 3 is a block diagram illustrating the overloading of an existing card that has its own card service with card services of other cards.

With reference now to the figures and in particular with reference to FIG. 1, a block diagram 5 illustrating a general topology of and relationship between card terminals 14, a client system 12, users 15, card service providers ("CSPs") 17 with card service provider databases ("CSP DBs") 19, an overloaded card providing server system 10 that provides overloaded card services for overloaded cards, and the present invention overloaded card manager server system 11 that manages each of the overloaded cards with their respective services is shown. The overloaded card providing ("OCP") server system 10 provides the present invention overloading feature for an existing card 18 (i.e. such as designated OC 18A shown in FIG. 3). The OCP server system 10 is in communications with card terminals 14 either directly or through a client system(s) 12. For example, existing card 18A that is shown in FIG. 3 is read by a card terminal 14. The card terminal 14 communicates with the OCP server system 10 (directly or through a respective client system 12). The OCP server system 10, in turn, is able to set up and provide the present invention overloading card feature for a designated or selected one of the existing card 18.

The overloaded card manager ("OCM") server system 11 manages the overloaded existing card 18 and its respective overloaded card services 20. (The overloaded existing card 18A and its associated services 20 are shown in FIG. 3). The OCM server system 11 generally tracks and maintains information for an overloaded card 18. For example, the OCM server system 11 maintains and tracks information of various cards 18 associated to the overloaded card 18 (such as account information, expiration date, personal identification number (PIN), etc.), information for contacting CSPs 17 of the various associated cards 18 when necessary or desired, and user information (such as user identification, user address, user telephone, user security information, etc.).

FIG. 1 shows that the OCM server system 11 is able to provide overloaded card managing services to various users 15 (i.e. user A 15A, user B 15B, user C 15C, user N 15N) each having an overloaded card 18. The users 15 are each able to communicate with the OCP server system 10 and/or the OCM server system 11. The OCM server system 11 is able to communicate to each of the CSPs 17 with respective card service provider databases ("CSP DBs") 19 (i.e. CSP A 17A with CSP DBA 19A, CSP B 17B with CSP DBB 19B, CSP C 17C with CSP DBC 19C, CSP Z 17Z with CSP DBZ 19Z). The OCM server system 11 communicates with a respective CSP(s) 17 when necessary or desired, such as when a user 15 wishes to make a change(s) or update(s) that affects the overloaded card services 20 of his/her overloaded card 18 (i.e. user information change, card 18 to be added and associated to the overloaded card 18, card to be deleted and disassociated from the overloaded card 18, etc.) or when an overloaded card 18 has expired and has been replaced by a newly issued card 18 that is the same account but has a new expiration date or when a user 15 desires to change the overloaded card 18 from being designated one existing card 18 to another existing card 18. The OCM server system 11 is also able to provide a user 15 with the information necessary to manage, track, and maintain the status and activity(ies) of the overloaded card 18. The OCM server system 11 is able to automatically maintain and update information for a user 15 relating to the overloaded card 18.

Figure 2:
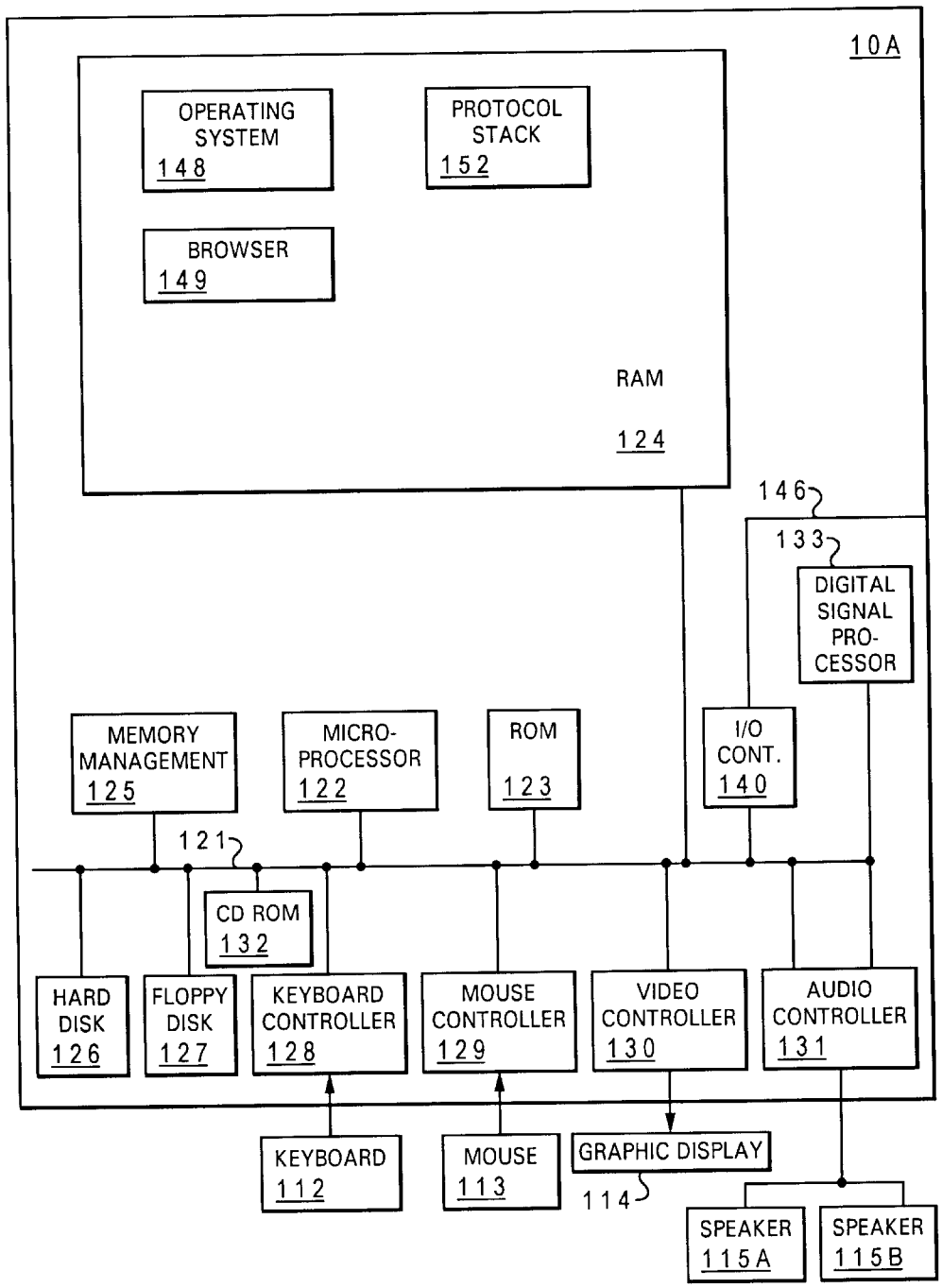
FIG. 2 is an overall example block diagram of a hardware system that may be the overloaded card providing server system, the present invention overloaded card manager server system, or the client system used in a system and method for overloading an existing card.

Referring to FIG. 2, an overall example block diagram of the hardware system 10A that may be the OCP server system 10, the present invention OCM server system 11, or the client system 12 used in a system and method for overloading an existing card is shown. The hardware system 10A is generally a networked system. The hardware system 10A has a number of sub-systems in communications with or to each other on a communications bus 121. The various sub-systems coupled to the bus 121 include but are not limited to the following systems or devices: a memory management system 125, a microprocessor 122, a read only memory (ROM) system 123, a random access memory (RAM) system 124, an input/output controller (I/O CONT.) 140, a digital signal processor 133, a hard disk 126, a floppy disk 127, a CD ROM 132, a keyboard controller 128, a mouse controller 129, a video controller 130, and an audio controller 131. The I/O CONT. 140 provides communications to an input/output device via line 146. A keyboard 112 is coupled to the keyboard controller 128. A mouse 113 is coupled to the mouse controller 129. A graphic display 114 is coupled to the video controller 130. Speakers 115A and 115B are coupled to the audio controller 131. The RAM system 124 is divided into at least the following memory allocations: 1) operating system 148; 2) protocol stack 152; and 3) a browser or web browser 149. Furthermore, as an example, the card terminal 14 may be any system or device that is able to read data from the existing card 18A and that is able to communicate to a server system 10.

The present invention is not in any way limited to the specific topologies or configurations disclosed herein, and any system and method of providing overloading features to an existing card wherein the existing card has its own card service and is able to be overloaded with card services of other cards and any system and method for managing such an overloaded card may be used for the present invention. The present invention is also not in any way limited to the specific hardware disclosed above for the hardware system 10A, the OCP server system 10, the OCM server system 11, the client system 12, the card terminal 14, and any suitable system, sub-system, and/or device may be used to implement the present invention or in conjunction with the present invention. Furthermore, the OCP server system 10 and the OCM server system 11 are shown as separate systems in the figures, but they may also be easily combined in being provided by a single server system.

With reference to FIG. 3, a block diagram 16 illustrating the overloading of an existing card 18A (i.e. Card A) that has its own card service 20 (i.e. Card A service or CSA) with card services 20 (i.e. CSB, CSC, . . . , CSZ) of other cards 18 (i.e. Card B, Card C, . . . , Card Z). The existing card 18A (i.e. Card A) is set up to be the overloaded card or the card with the overloaded feature. As shown in FIG. 3, the existing card 18A (i.e. Card A) has its own card service 20A (i.e. Card A service or CSA). The other cards 18 (i.e. Card B, Card C, . . . , Card Z) also have their own respective card services 20 (i.e. Card B service (CSB), Card C service (CSC), . . . , Card Z service (CSZ)). The present invention associates the card services 20 (i.e. CSB, CSC, . . . CSZ) of the other cards 18 (i.e. Card B, Card C, . . . Card Z) to the existing card 18A so that the existing card 18A is the only card that has to be used and accessed to be able to use its own card service 20 (i.e. CSA) as well as the other card services 20 (i.e. CSB, CSC, . . . , CSZ). The server system 10 is set up and programmed to provide the overloading feature. Preferences and settings for the card services 20 associated to the existing card 18A (i.e. Card A) may be set up so that a preferred order of use of the card services 20 for the various cards 18 is followed based on various situations and scenarios. As stated earlier, the overloaded card is disclosed in detail in the co-pending U.S. application Ser. No. 09/465,292 entitled "SYSTEM AND METHOD FOR OVERLOADING AN EXISTING CARD". card services 20 (i.e. CSB, CSC, . . . , CSZ). The server system 10 is set up and programmed to provide the overloading feature. Preferences and settings for the card services 20 associated to the existing card 18A (i.e. Card A) may be set up so that a preferred order of use of the card services 20 for the various cards 18 is followed based on various situations and scenarios. As stated earlier, the overloaded card is disclosed in detail in the co-pending U.S. application Ser. No. 09/465,292 entitled "SYSTEM AND METHOD FOR OVERLOADING AN EXISTING CARD".

Figure 4:
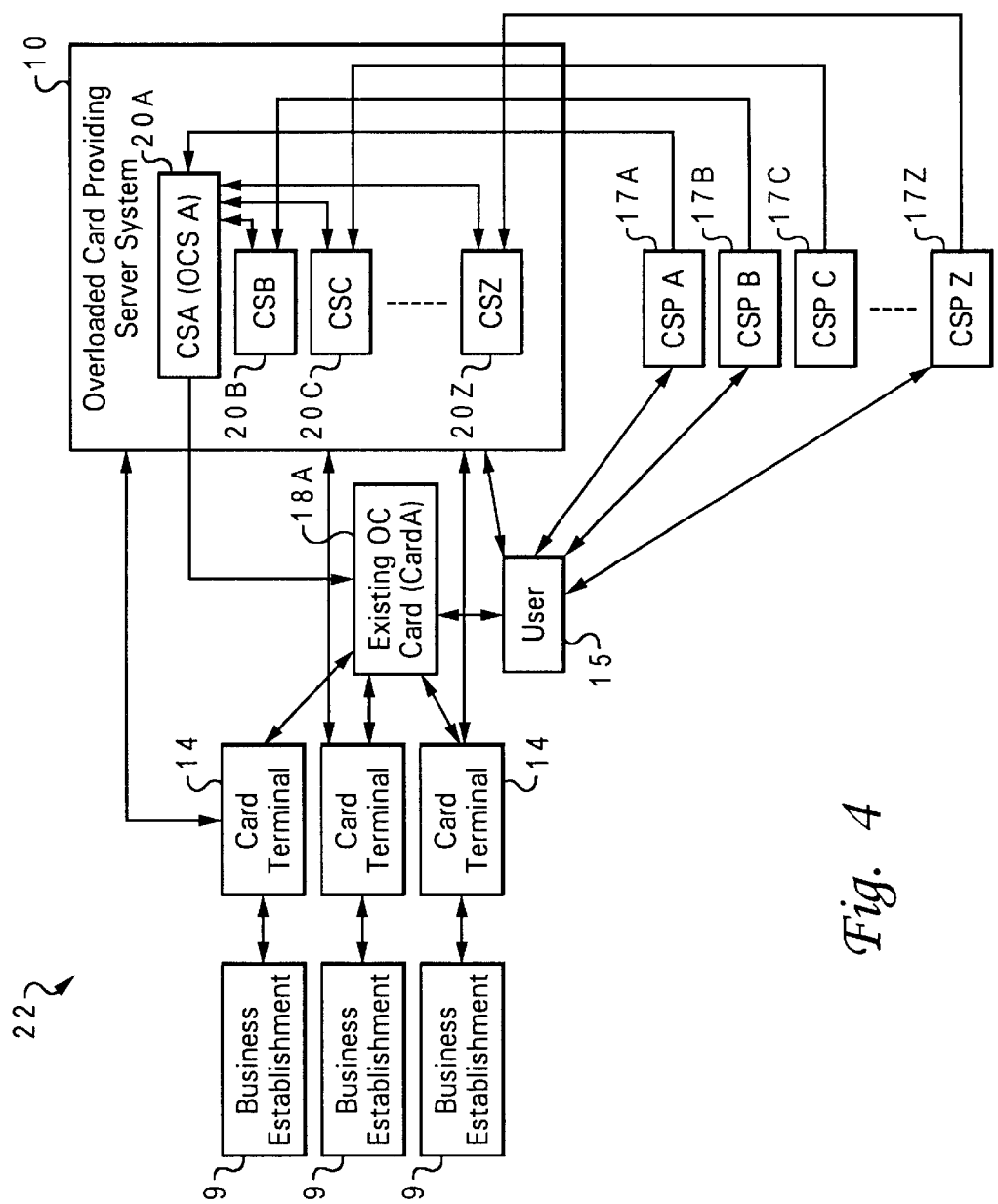
FIG. 4 is a block diagram illustrating management by a user of an overloaded card and its overloaded card services without the present invention overloaded card manager.

Referring to FIG. 4, a block diagram 22 illustrating management by a user 15 of an overloaded card 18A and its overloaded card services 20 without the present invention overloaded card manager is shown. FIG. 4 shows that card A is designated and used as the existing overloaded card ("OC") 18A, and the OC 18A is able to be read and used at one of a number of card terminals 14. The card terminals 14 are each at a business establishment 9. The OC 18A is recognized as an overloaded card since the OCP server system 10 is in communications with each of the card terminals 14. The OCP server system 10 provides the existing OC 18A with the overloaded card services. FIG. 4 shows that OC 18A is provided the overloaded card services by providing to OC 18A (i.e. card A) the card service for card A ("CSA") as well as providing the associated card services (i.e. card service B ("CSB"), card service C ("CSC"), . . . , card service Z ("CSZ") for each of the respective associated cards (i.e. cards B, C, . . . , Z). A card service provider (i.e. CSP A 17A, CSP B 17B, CSP C 17C, . . . , CSP Z 17Z) provides the respective card service for the corresponding card.

In FIG. 4, the management of the OC 18A (i.e. card A) and its related card services 20 has to be maintained by the user 15. For example, when a user 15 wishes to make a change(s) or update(s) that affects the overloaded card services 20 of his/her overloaded card 18A, then the burden is on the user 15 to make and/or track these changes. For example, if the user 15 wishes or needs to change any of the user information change, such as user address, user phone, and/or user security information, etc., then the user 15 as shown in FIG. 4 has to remember each associated card 18 and contact each and every CSP 17 (i.e. CSP A 17A, CSP B 17B, CSP C 17C, . . . , CSP Z 17Z) to provide the change of information the respective multiple number of times. Furthermore, if the user 15 wishes to add and associate a new card(s) 18 to the OC 18A (i.e. card A) or delete and disassociate a card(s) 18 from the OC 18A, then the user 15 has to manually track which cards 18 are associated to the OC 18A and which cards 18 are not associated to the OC 18A. Also, when the OC 18A (i.e. card A) has expired in its own card services (CSA) and has been replaced by a newly issued card 18A (i.e. newly issued card A) that is the same account but has a new expiration date, then the user 15 may be hassled with having to program and re-initiate the newly issued card 18A as an OC 18A again by remembering and providing all of the previous information and settings associated to the previously issued card 18A.

Figure 5:
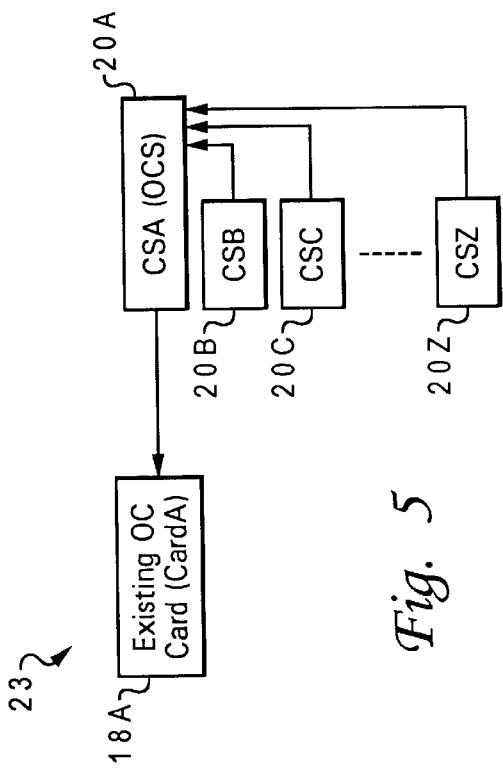
FIGS. 5 and 6 are block diagrams showing a user changing the overloaded card as being designated from one existing card to another existing card.
Figure 6:
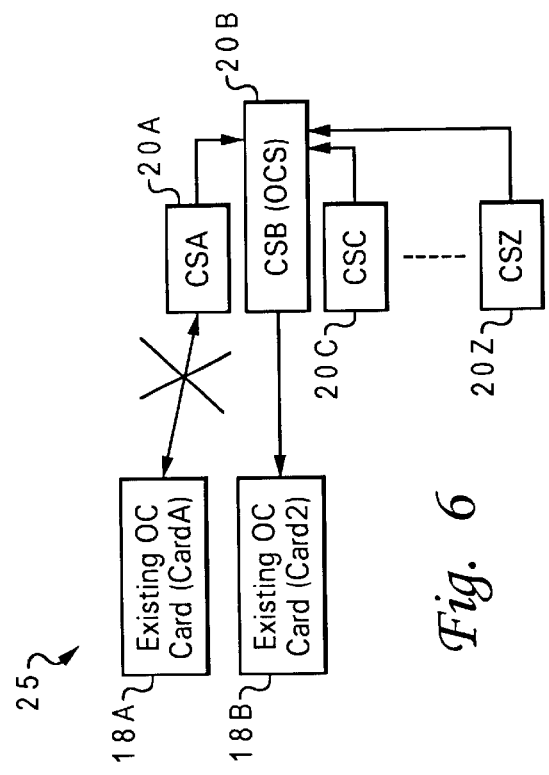

With reference to FIGS. 5 and 6, block diagrams 23 and 25 that illustrate a user changing the overloaded card as being designated from one existing card 18A (i.e. card A) to another existing card 18B (i.e. card B) are respectively shown. Block diagram 23 shows that the OC 18A is designated as existing card A. The OC 18A provides overloaded card services by providing its own card service (i.e. CSA 20A) and card services for cards B, C, . . . , Z (i.e. CSB 20B, CSC 20C, . . . , CSZ 20Z). Block diagram 25 shows that the designation of OC 18A is changed from card A to card B. In block diagram 25, the former designated OC 18A (i.e. card A) is cancelled as being the overloaded card, and the newly designated OC 18B (i.e. card B) now provides the overloaded card services by providing its own card service (i.e. CSB 20B) and card services for cards A, C, . . . , Z (i.e. CSA 20A, CSC 20C, . . . , CSZ 20Z). 18A is designated as existing card A. The OC 18A provides overloaded card services by providing its own card service (i.e. CSA 20A) and card services for cards B, C, . . . , Z (i.e. CSB 20B, CSC 20C, . . . , CSZ 20Z). Block diagram 25 shows that the designation of OC 18A is changed from card A to card B. In block diagram 25, the former designated OC 18A (i.e. card A) is cancelled as being the overloaded card, and the newly designated OC 18B (i.e. card B) now provides the overloaded card services by providing its own card service (i.e. CSB 20B) and card services for cards A, C, . . . , Z (i.e. CSA 20A, CSC 20C, . . . , CSZ 20Z).

When a user 15 desires to change the OC from being designated as one existing card 18A (i.e. card A) to another existing card 18B (i.e. card B) as shown in FIGS. 5 and 6, then the user 15 needs to track and remember all of the card information associated with the one existing card 18A, cancel the one existing card 18A (i.e. card A) as the overloaded card with its overloaded services, and set up and program the other card 18B (i.e. card B) and its respective services with all of the information from the one existing card 18A (i.e. card A) and any other new information to designate and use this other card 18B as the OC. Furthermore, if the overloaded card system and method requires advising every CSP 17 of each associated card 18 as to which card 18 is being used as the designated OC, then the user 15 would have to contact each and every CSP 17 (i.e. CSP A 17A, CSP B 17B, CSP C 17C, . . . , CSP Z 17Z) and thus provide the new overloaded card designation the respective multiple number of times.

Figure 7:
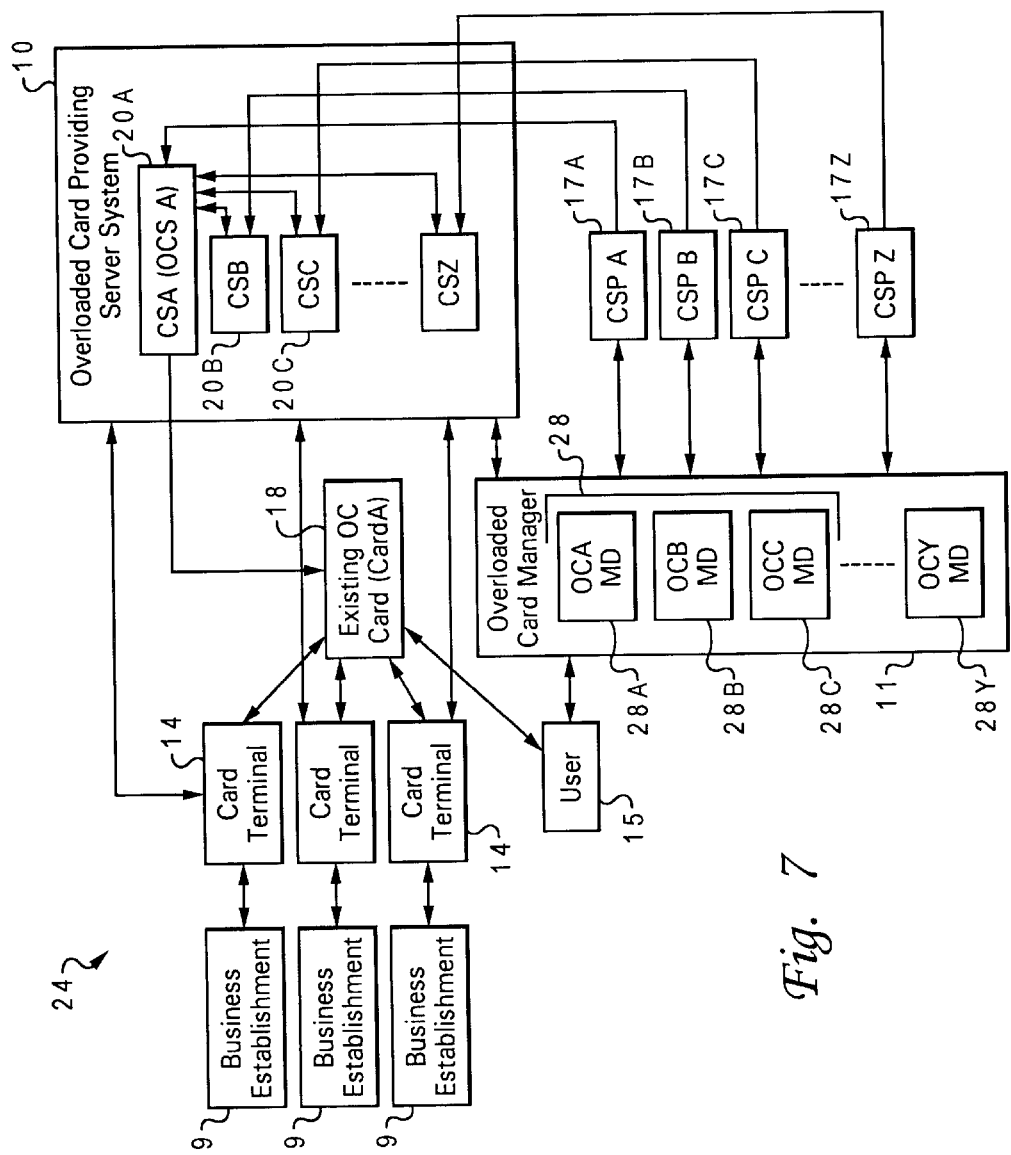
FIG. 7 is a block diagram illustrating management by the present invention overloaded card manager of an overloaded card and its overloaded card services.

Referring to FIG. 7, a block diagram 24 illustrating management by the present invention overloaded card manager (i.e. OCM server system) 11 of an overloaded card and its overloaded card services is shown. The block diagram 24 of FIG. 7 is similar to the block diagram 22 of FIG. 4 except that the block diagram 24 provides the present invention overloaded card manager or OCM server system 11 that manages the overloaded card 18A instead of the user 15 having to manage the overloaded card 18A as shown in FIG. 4. The OCM 11 has management data 28 (i.e. overloaded card A management data (OCA MD) 28A, overloaded card B management data (OCB MD) 28B, overloaded card C management data (OCC MD) 28C, . . . , overloaded card Y management data (OCY MD) 28Y) for each overloaded card (i.e. overloaded card A (OCA), overloaded card B (OCB), overloaded card C (OCC), . . . , overloaded card Y (OCY)). The overloaded card management data 28 is used by the OCM 11 to manage the overloaded card 18A.

Figure 8:
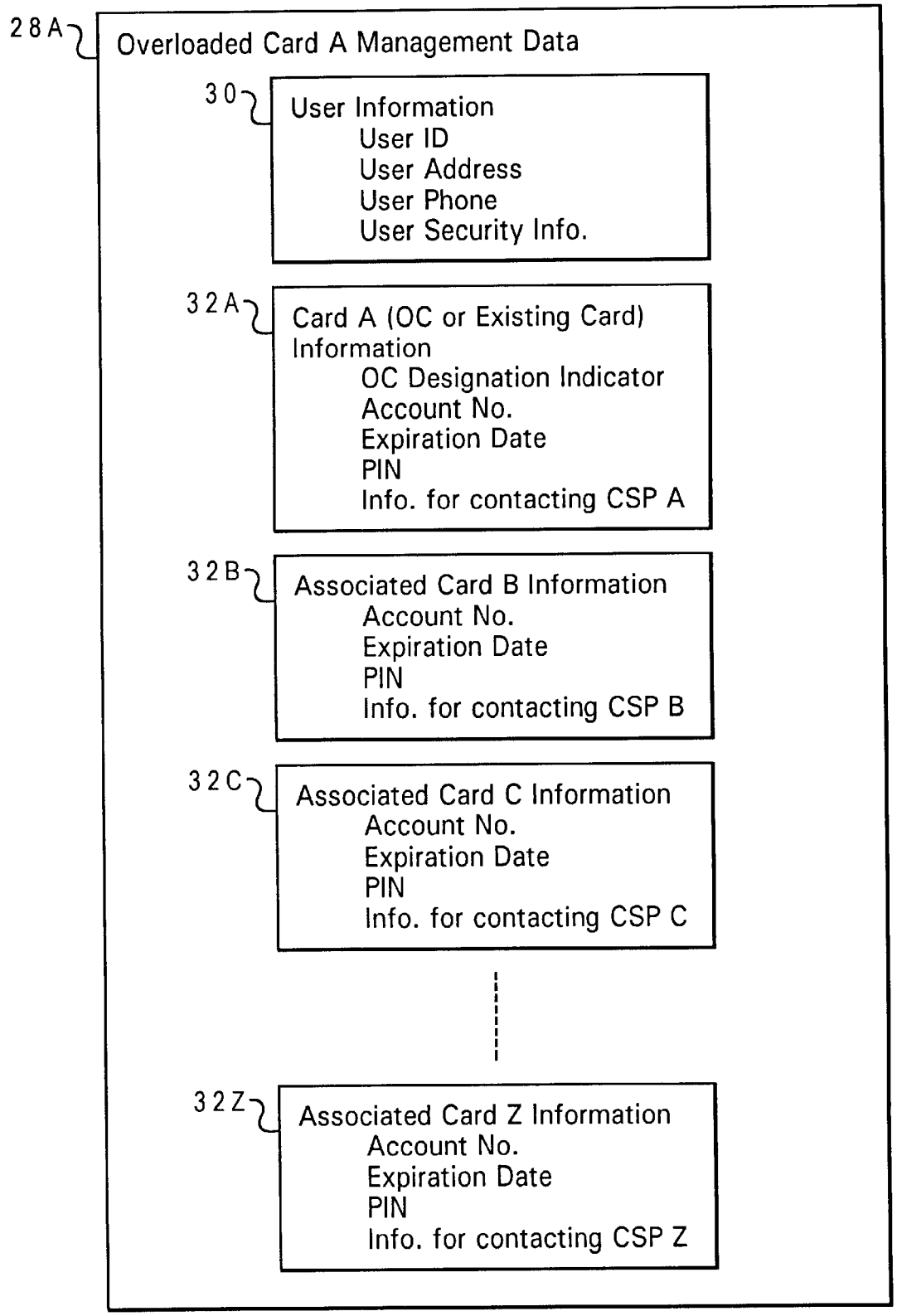
FIG. 8 is a block diagram illustrating an example format of management data for an overloaded card wherein the management data is used by the present invention overloaded card manager.

With reference to FIG. 8, a block diagram illustrating an example format for OC management data 28A (i.e. OCA MD) is shown. Each of the OC management data 28 in the OCM 11 of FIG. 7 may have the same or similar type data and/or format, but the management data 28 is not limited in any way to any particular data or format. FIG. 8 shows that the OC management data 28A comprises user information 30 (such as user identification (ID), user address, user phone, user security information, etc.) and card information 32A, 32B, 32C, . . . , 32Z. The card information includes existing OC card A information 32A (such as an OC designation indicator that indicates the card is a designated OC, account information, expiration date, PIN, and information for contacting CSP A), associated card B information 32B (such as account information, expiration date, PIN, and information for contacting CSP B), associated card C information (such as account information, expiration date, PIN, and information for contacting CSP C) . . . , associated card Z information (such account information, expiration date, PIN, and information for contacting CSP Z). information, expiration date, PIN, and information for contacting CSP B), associated card C information (such as account information, expiration date, PIN, and information for contacting CSP C) . . . , associated card Z information (such account information, expiration date, PIN, and information for contacting CSP Z).

FIG. 7 shows that, instead of the user 15 having to be in contact with each and every CSP 17, the OCM 11 is able to communicate with each and every CSP 17. The OCM 11 is also in communications with the OCP server system 10 so that any change(s) made to overloaded card services for any overloaded card 18A is tracked and respectively updated by the OCM 11. Thus, changes relating to the overloaded card 18A may be made either by the user 15 directly communicating with the OCM 11 or by indirectly communicating to the OCM 11 through the OCP server system 10 or the use of the existing OC 18A or any other suitable manner. The OCM 11 allows any update(s) and/or change(s) to be efficiently made and provides current and updated overview, status, and card account information to the user 15.

When a user 15 wishes to make a change(s) or update(s) that affects the overloaded card services 20 of his/her overloaded card 18A (i.e. card A), the OCM 11 as shown in FIG. 7 assumes the burden and tasks from the user 15 to make and/or track these changes. For example, if the user 15 wishes or needs to change any of the user information, such as user address, user phone, and/or user security information, etc., then the user 15 as shown in FIG. 7 simply communicates with the OCM 11 (either directly or indirectly through the OCP server system 10 or OC 18A (i.e. card A)) to make the change. Thus, the user 15 inputs the respective change(s) that modifies the respective user information 30 in the OC management data 28, and the OCM 11 is programmed to communicate with all of the CSPs 17 by using the information for contacting the respective CSPs 17 to automatically update each and every CSP 17 with the change(s).

Furthermore, if the user 15 wishes to add and associate a new card(s) 18 to the OC 18A (i.e. card A) or delete and disassociate a card(s) 18 from the OC 18A, then the user 15 makes the change by directly or indirectly communicating with the OCP server system 10 to make such addition(s) or deletion(s). The OCM 11 is in communication with the OCP server system 10 such that it tracks and updates its respective OC management data 28 with any addition(s), deletion(s), or any other such modification(s) or change(s) made that affect or relate to the user's OC 18A (i.e. card A). Thus, a current/automatically updated status or overview of the associated cards and card services to the OC 18A is able to be easily/readily obtained by the user 15 without the user 15 having to manually track the cards 18 associated and not associated to the OC 18A.

Also, when the OC 18A (i.e. card A) has expired in its own card services (CSA) and has been replaced by a newly issued card 18A (i.e. newly issued card A) that is the same account but has a new expiration date, then the OCM 11 is able to contact the CSPA to verify the newly issued card and obtain and automatically update the new expiration date at all respective places and continue using the same account card A as the designated OC 18A. The user 15 avoids having to re-program the newly issued card 18A as the OC and does not have to remember and provide all of the previous information and settings associated to the previously issued card 18A.

Furthermore, when a user 15 desires to change the OC from being designated as one existing card 18A (i.e. card A) to another existing card 18B (i.e. card B) as shown in FIGS. 5 and 6, then the OCM 11 is used to be able to easily accomplish this task since it tracks and stores all of the current/updated card information associated with the one existing card 18A. The OCM 11 is able to easily cancel or be used to cancel the one existing card 18A (i.e. card A) as the overloaded card with its overloaded services and is able to easily set up/program or be used to set up/program the other card 18B (i.e. card B) and its respective services with all of the information from the one existing card 18A (i.e. card A) and any other new information to designate and use this other card 18B as the OC. Furthermore, if the overloaded card system and method requires advising every CSP 17 of each associated card 18 as to which card is being used as the designated OC, then the OCM 11 is able to easily, efficiently, and automatically contact each and every CSP 17 (i.e. CSP A 17A, CSP B 17B, CSP C 17C, . . . , CSP Z 17Z) and thus conveniently provide the new overloaded card designation multiple times.

Figure 9:
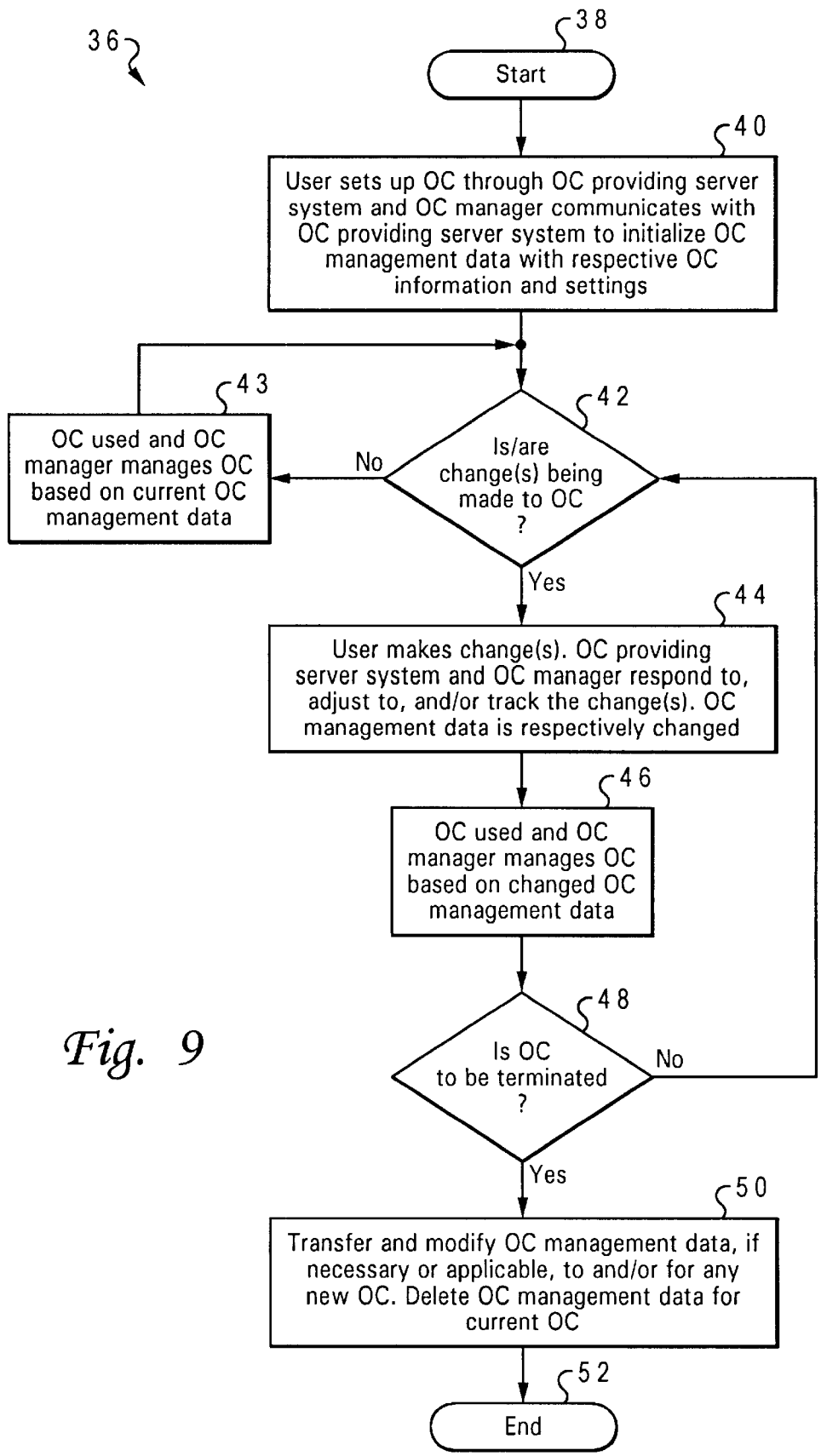
FIG. 9 is a flow chart of an algorithm for implementing and using the present invention overloaded card manager.

Referring to FIG. 9, a flow chart of an algorithm 36 for implementing and using the present invention overloaded card manager 11 is shown. The algorithm 36 starts at block 38 and moves to block 40. At block 40, the user 15 sets up the designated OC 18A through the OCP server system 10. The OCM server system 11 communicates with the OCP server system 10 to initialize the OC management data 28 with respective OC information and settings. The algorithm 36 moves to decision block 42 where the algorithm 36 determines whether any change(s) is/are being made that affect or relate to the OC 18A. If no changes are being made, then the algorithm 36 moves to block 43 where the OC 18A is used and the OCM 11 manages the OC 18A based on the current OC management data 28. The algorithm 36 loops back before decision block 42 and continues therefrom. where the algorithm 36 determines whether any change(s) is/are being made that affect or relate to the OC 18A. If no changes are being made, then the algorithm 36 moves to block 43 where the OC 18A is used and the OCM 11 manages the OC 18A based on the current OC management data 28. The algorithm 36 loops back before decision block 42 and continues therefrom.

On the other hand, if a change(s) is/are being made that affect or relate to the OC 18A, then the algorithm 36 moves from decision block 42 to block 44. At block 44, the user 15 makes the change(s). The OCP server system 10 and the OCM server system 11 respond to, adjust to, and/or track the change(s). The OC management data 28 is respectively changed. The algorithm 36 moves to block 46. At block 46, the OC 18A is used and the OCM 11 manages the OC 18A based on the changed OC management data 28. The algorithm 36 moves to decision block 48 where the determination of whether the OC 18A is to be terminated is made. If the OC 18A is not to be terminated, then the algorithm 36 loops back to decision block 42 and continues therefrom. On the other hand, if the OC 18A is to be terminated, then the algorithm 36 moves to block 50. At block 50, the OC management data 28 is transferred and modified, if necessary or applicable, to any newly designated OC 18A. The OC management data 28 for the old OCA 18 is deleted. The algorithm 36 ends at block 52.

The present invention OCM 11 allows a user 15 to maintain and keep track of all accounts associated with an OC 18A. The OCM 11 permits the user 15 to more easily move all accounts to a new card since it tracks and performs automated updates any changes to the OC 18A. The OCM 11 also allows various institutions and business establishments to be automatically informed when a new card is issued with a new expiration date, a new account number, or any other such change. The OCM 11 serves as a central repository for handling account/card service closures when a card is stolen or when desired or needed. Overloaded accounts or services 20 are able to be immediately moved to a different or new card 18. The OCM 11 allows user information to be automatically updated to all card service providers 17 for all accounts/card services 20. Furthermore, terminals 14 are able to reference the OCM 11 for additional security verifications and to provide customers additional options at the point of use thereat.

While the invention has been particularly shown and described with reference to a preferred embodiment, it will be understood by those skilled in the art that various changes in form and detail may be made therein without departing from the spirit and scope of the invention.

What is claimed is:

1. A method of providing, using, and managing a card with a card service, comprising the steps of:

associating a host card with an associated card service, setting up the host card with at least one other card service by associating the at least one other card service of the at least one other card with the host card, and managing the host card with the at least one other card service within a networked server independent of altering any data on the host cards, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated.

2. The method according to claim 1, wherein the managing step further comprises the steps of:

maintaining and storing overloaded card management data relating to the host card and the at least one other card service, tracking a change, if any, made to the host card and the at least one other card service, updating the overloaded card management data to reflect the change, and performing appropriate actions in response to the change.

3. The method according to claim 2, wherein the change is to information that requires at least one card service provider of the at last one other card service to be informed of the change and wherein:

the maintaining and updating step further comprises the step of maintaining and updating information for contacting the at least one card service provider, and the performing step further comprises the step of contacting and updating the respective at least one card service provider with the change by using the information for contacting a provider of the at least one other card service.

4. The method according to claim 3, wherein the provider of the at least one other card service includes all card service providers of the at least one other service.

5. The method according to claim 4, wherein the information is user information and the change is to user information that requires all of the card service providers of the at least one other card service to be informed of the change.

6. The method according to claim 2, wherein the overloaded card management data further comprises at least user information, overloaded card information, and associated card information.

7. The method according to claim 6, wherein the change is to the user information.

8. The method according to claim 7, wherein the user information further comprises a user name, a user address, a user telephone, and a user security information.

9. The method according to claim 6, wherein the change is to the overloaded card information.

10. The method according to claim 9, wherein the overloaded card information further comprises an overloaded card designation indicator, an account number, an expiration date, any security information, and information for contacting a respective card service provider.

11. The method according to claim 6, wherein the change is to the associated card information for the at least one associated card.

12. The method according to claim 11, wherein the associated card information further comprises an account number, an expiration date, any security information, and information for contacting a respective card service provider.

13. A system of providing, using, and managing a card with a card service, comprising:

means for associating a host card with an associated card service that is used by a card user, means for setting up the host card with at least one other card service by associating the at least one other card service of the at least one other card with the host cards, and means for managing the host card with the at least one other card service within a networked server independent of altering any data on the host card, wherein said means for managing includes:

means responsive to a specified vendor establishment being designated as associated with one of said at least one other card service, for automatically charging said one of said at least one other card service when said host card is used at said specified vendor establishment, and means for charging another of said at least one card service responsive to no specified vendor being designated.

14. The system according to claim 13, wherein the means for managing the host card maintains and stores overloaded card management data relating to the host card and the at least one other card service, tracks a change, if any, made to the host card and the at least one other card service, updates the overloaded card management data to reflect the change, and causes performance of appropriate actions in response to the change to be made.

15. The system according to claim 14, wherein:

the change is to information that requires at least one card service provider of the at least one other card service to be informed of the change, information for contacting the at least one card service provider is maintained and updated, and the respective at least one card service provider is contacted and updated with the change by using the information for contacting the at least one card service provider.

16. The system according to claim 15, wherein the at least one card service provider is all card service providers of the at least one other service.

17. The system according to claim 16, wherein the information is user information and the change is to user information that requires all of the card service providers of the at least one other card service to be informed of the change.

18. The system according to claim 14, wherein the overloaded card management data further comprises at least user information, overloaded card information, and associated card information.

19. The system according to claim 18, wherein the change is to the user information.

20. The system according to claim 19, wherein the user information further comprises a user name, a user address, a user telephone, and a user security information.

21. The system according to claim 18, wherein the change is to the overloaded card information.

22. The system according to claim 21, wherein the overloaded card information further comprises an overloaded card designation indicator, an account number, an expiration date, any security information, and information for contacting a respective card service provider.

23. The system according to claim 18, wherein the change is to the associated card information.

24. The system according to claim 23, wherein the associated card information further comprises an account number, an expiration date, any security information, and information for contacting a respective card service provider.

25. A program product for providing, using, and managing a card with a card service, comprising:

instruction means for associating a host card with an associated card service that is used by a card user, instruction means for setting up the host card as an overloaded card with overloaded card services by associating the at least one other service of the at least one other card to the host card, instruction means for managing the overloaded card with the overloaded services within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated, and computer usable media bearing said instruction means.

26. The program product according to claim 25, wherein said computer usable media is a memory media.

27. The program product according to claim 25, wherein said computer usable media bearing is a floppy disk.

* * * * *

UNITED STATES PATENT AND TRADEMARK OFFICE
CERTIFICATE OF CORRECTION

PATENT NO. : 6,427,910 B1
DATED : August 6, 2002
INVENTOR(S) : Barnes et al.

It is certified that error appears in the above-identified patent and that said Letters Patent is hereby corrected as shown below:

<u>Title page,</u>
Item [74], *Attorney, Agent, or Firm,* please delete
"Marilyn Smith Dewkins" and replace with -- Marilyn Smith Dawkins --.

<u>Column 8,</u>
Please delete duplicate lines 28-31, and replace with -- information for contacting CSP Z). --

Signed and Sealed this

Eighteenth Day of February, 2003

JAMES E. ROGAN
*Director of the United States Patent and Trademark Office*